United States Patent [19]

Giannini et al.

[11] Patent Number: 4,542,197

[45] Date of Patent: * Sep. 17, 1985

[54] POLYMERIZATION CATALYST

[75] Inventors: Umberto Giannini; Paolo Longi; Domenico Deluca; Bruno Pivotto, all of Milan, Italy

[73] Assignee: Montecatini Edison S.p.A., Milan, Italy

[*] Notice: The portion of the term of this patent subsequent to Nov. 3, 1998 has been disclaimed.

[21] Appl. No.: 553,060

[22] Filed: Nov. 18, 1983

Related U.S. Application Data

[63] Continuation of Ser. No. 548,172, Feb. 7, 1975, abandoned, which is a continuation of Ser. No. 329,430, Feb. 5, 1973, abandoned, which is a continuation of Ser. No. 49,181, Jun. 23, 1970, abandoned.

[30] Foreign Application Priority Data

Jun. 24, 1969 [IT] Italy .................................. 18597 A/69

[51] Int. Cl.$^4$ .......................... C08F 4/02; C08F 10/02
[52] U.S. Cl. ........................... 526/125; 502/104; 502/105; 502/134; 526/161; 526/352; 526/906
[58] Field of Search ............... 526/125; 502/134, 105, 502/104

[56] References Cited

U.S. PATENT DOCUMENTS

| | | | |
|---|---|---|---|
| 2,981,725 | 4/1961 | Luft et al. | 526/125 |
| 3,238,146 | 3/1966 | Hewett | 526/125 |
| 3,394,156 | 7/1968 | Kornicker et al. | 526/159 |
| 3,642,746 | 2/1972 | Kashiwa et al. | 526/125 |
| 4,298,718 | 11/1981 | Mayr et al. | 526/125 |

FOREIGN PATENT DOCUMENTS 222426 6/1959 Australia.
1958488 5/1970 Fed. Rep. of Germany.

Primary Examiner—Edward J. Smith

[57] ABSTRACT

Polymerization catalysts, particularly catalysts for the polymerization of olefins, are disclosed. The catalysts are prepared by mixing hydrides of organometallic compounds of metals belonging to Groups I to III of the Mendelyeev Periodic Table with products obtained by contacting (1) titanium compounds of the formula

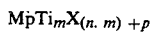

$$M_p Ti_m X_{(n \cdot m)+p}$$

in which M is an alkaline metal or the group $NR_4$ in which the valences of the quaternary nitrogen atom are satisfied by hydrogen and/or by hydrocarbon groups or is part of a heterocyclic ring; $X_{n \cdot m}$ substituents are $NR_2$ group in which the Rs represent hydrogen, and/or hydrocarbon groups or, in part, halogen atoms; n is the titanium valence; m is a whole number from 1 to 3 inclusive; and p is zero or a whole number from 1 to 3, inclusive; with (2) carriers consisting of anhydrous Mg halides which are in active form or converted to active form by the conditions under which the carriers are contacted with the titanium compounds. The catalysts are particularly effective in the polymerization of ethylene and the copolymerization thereof with higher alpha-olefins and/or diolefins.

23 Claims, No Drawings

POLYMERIZATION CATALYST

This is a continuation of application Ser. No. 548,172 filed Feb. 7, 1975, abandoned, which in turn is a continuation of Ser. No. 329,430 filed Feb. 5, 1973 and now abandoned, which in turn is a continuation of Ser. No. 049,181 filed June 23, 1970 and now abandoned.

THE PRIOR ART

The polymerization and copolymerization of ethylene have been carried out with the aid of catalysts of various types. One of the best known catalysts for such purposes is obtained by mixing a titanium or vanadium compound with an organometallic derivative of a metal belonging to Groups I, II or III of the Mendelyeev Periodic Table.

Previously, our group has provided improved, very highly active catalysts prepared by mixing a hydride or organometallic compound of the Groups I to III metals with the product formed by contacting a titanium or vanadium halide with a carrier consisting of an anhydrous magnesium or zinc chloride which is either preactivated or activated by the conditions under which it is contacted with the transition metal halide.

THE PRESENT INVENTION

One object of this invention was to provide new catalysts of the type aforesaid, in the preparation of which a Ti compound is contacted with a carrier consisting of an anhydrous Mg halide, and which are also highly active in the polymerization of ethylene and mixtures thereof with higher alpha-olefins and/or diolefins.

Unexpectedly, it has been found that the new, alternative, highly active catalysts are obtained when the Ti compound contacted with the anhydrous carrier has the formula set forth in the abstract. In said formula, when M is the group $NR_4$ and R is a hydrocarbon group, the latter may be, for example, an alkyl, aryl, aryl-alkyl or cycloalkyl group. In the $NR_2$ groups represented by $X_{n.m}$, when R is a hydrocarbon group it may also be an alkyl, aryl, aryl-alkyl or cycloalkyl group. In some of the $NR_2$ groups, the R may be halogen. Representative Ti compounds embraced in the formula $M_p Ti_m X_{(n.m)+p}$ include:

$Ti[Ni(C_2H_5)_2]$; $Ti[N(C_2H_5)_2]_3Cl$;
$Ti[N(C_2H_5)_2]_2Cl_2$; $Ti[N(C_2H_5)_2]Cl_3$;
$Ti[N(C_4H_9)_2]_4$; $Ti[N(C_6H_{11})_2]_3Cl$;
$Ti[N(C_6H_5)_2]_4$; $Ti[N(C_6H_5)_2]Cl_3$
$N(C_2H_5)_4Ti[N(C_2H_5)_2]Cl_4$;
$[N(CH_3)_4]_2Ti[N(C_6H_5)_2]_3Cl_3$;
$N(C_2H_5)_4Ti_2[N(C_2H_5)_2]_2Cl_7$;
$(C_5H_5NH)_3Ti[N(C_2H_5)_2]Cl_5$;
$N(C_6H_{11})_4Ti_2[N(C_6H_5)_2]_2Cl_7$; $Ti[N(C_6H_{13})_2]Br_3$;
$N(CH_3)_3(C_{16}H_{33})Ti_2[N(C_4H_9)_2]_2I_7$

The new catalysts are thus prepared by mixing a hydride or organometallic compound of the Group I to III metal with the product formed by contacting a Ti compound of the formula given with an active carrier consisting of an anhydrous Mg halide, more particularly the chloride or bromide, the Mg halide being in preactivated condition or rendered active by the conditions under which the Ti compound is contacted with it. By "active anhydrous magnesium halide" we mean such a halide having one or both of the following characteristics:

(A) the diffraction line in the X-ray spectrum thereof, which corresponds to the most intense line in the spectrum of the normal inert magnesium halide, is less intense.

(B) the active halide has a surface area higher than 3 $m^2/g$, preferably higher than 10 $m^2/g$.

The most active magnesium halides are characterized in that the X-ray spectra thereof show a broadening of the diffraction line which is normally most intense, and/or have a surface area higher than 15 $m^2/g$.

In the case of anhydrous magnesium chloride, the active form is characterized in that, in its X-ray powder spectrum, the diffraction line at $d=2.56$ Å, which is most intense in the spectrum of the normal, inert $MgCl_2$, is remarkably decreased in intensity, and a diffused halo appears localized in the range of lattice distances $d=2.56$ to $d=2.95$ Å.

Similarly, the X-ray powder spectrum of the active $MgBr_2$ is characterized in that the diffraction line at lattice distance $d=2.93$ Å, which is the most intense line in the spectrum of normal, inert $MgBr_2$, is remarkably decreased in intensity and a diffused halo appears localized in the range of lattice distances $d=2.80$ to $d=3.25$ Å.

In a presently preferred embodiment of the invention, the supported catalytic component is prepared by co-grinding the Ti compound and the anhydrous Mg halide by conventional techniques, for a grinding time and under conditions such that the anhydrous Mg halide is converted to active form having one or both of the characteristics (A) and (B) described above.

Preferably, the co-grinding is carried out in a ball mill, by the dry method, i.e., in the absence of inert solvents.

Alternatively, the anhydrous mgnesium halide may be preground and activated thereby, and then mixed with the solid Ti compound. Preferably, however, in this embodiment, the compounds are used in suspension in an inert solvent or diluent.

The active anhydrous magnesium halide may be obtained, also, by other methods. One such method consists in starting with compounds of the formula RMgX, in which R is a hydrocarbon radical, and X is halogen, and subjecting said starting material to disproportionation by known methods. Another method comprises the compound RMgX with a halogenated compound such as, for instance, anhydrous gaseous hydrochloric acid. By these methods, there are obtained activated Mg halides having a surface area of 30 $m^2/g$.

Still another method for obtaining the active anhydrous Mg halide involves the thermal decomposition, at reduced pressure, of the addition compounds of the Mg halides with Lewis bases or acids.

Yet another method for obtaining the active anhydrous Mg halide involves the thermal decomposition of Mg halides containing organic crystallization solvents. For example, active $MgCl_2$ can be obtained by this method from solutions thereof in ethanol.

By the last-mentioned methods, also, there are obtained active anhydrous Mg halides having a surface area of 30 $m^2/g$.

The amount of the Ti compound used in preparing the supported catalytic component may be comprised within a wide range of values, the lower limit of which may be less than 0.01% by weight, with respect to the carrier, and the upper limit of which may be 30% or more, by weight.

So far as concerns the yield of polymer on the amount of catalyst used, referred to both the Ti compound and the carrier, the best results are obtained when the amount of Ti on the carrier is from 1% to 10%, by weight.

Hydrides and organometallic compounds which are particularly suitable for use as component (A) of the catalyst include the following:

$Al(C_2H_5)$; $Al(C_2H_5)_2Cl$; $Al(iC_4H_9)_3$; $Al(iC_4H_9)_2Cl$; $Al_2(C_2H_5)_3Cl_3$; $Al(C_2H_5)_2H$; $Al(iC_4H_9)_2H$; $Al(C_2H_5)_2Br$; $LiAl(iC_4H_9)_4$; $Li(iC_4H_9)$.

The molar ratio between the Al compound and the Ti compound is not critical. For polymerizing ethylene, said ratio is preferably comprised between 50 and 100.

These new catalysts can be used in the polymerization and copolymerization of olefins by the known methods, that is in the liquid phase, in the presence or absence of inert diluents, and in the gaseous phase.

The polymerization temperature may be from $-80°$ C. to 200° C. Preferably, a temperature of from 50° C. to 100° C. is used. Atmospheric or superatmospheric pressure may be used.

It is often desirable to regulate the molecular weight of the polyethylene or ethylene copolymer which is produced, in order to improve the processability of the polymer or copolymer by conventional means.

A disadvantage of the prior art catalysts prepared by mixing an organometallic compound of a Group I to III metal with a transition metal compound (so-called "Ziegler-type" catalysts) is that the activity of those catalysts is considerably reduced when hydrogen or other chain transfer agents are included in the polymerization zone for regulating the molecular weight of the polymer produced.

It is an outstanding advantage of the present catalyst that they can be used in the presence of the molecular weight regulators without any appreciable reduction in the activity of the catalysts.

For instance, it has been found that the molecular weight of polyethylene produced by polymerizing ethylene in contact with catalysts according to this invention, in the presence of the known molecular weight regulators, can be controlled within a practical range corresponding to intrinsic viscosities (tetralin at 135° C.) of from about 1 to about 3.9 dl/g; without a decrease in the polymer yield to a value at which it would be necessary to subject the polymer to purifying treatments to remove catalyst residues, at the end of the polymerization.

Polyethylene obtained by polymerizing ethylene in contact with the present catalysts is a substantially linear, highly crystalline polymer having a density of at least 0.96 g/cc. The processability characteristics of this polyethylene are excellent, generally better than those of polyethylene obtained with the aid of the so-called "Ziegler" catalysts.

The Ti content of the non-purified polyethylene obtained using the catalysts of this invention is generally less than 10 ppm.

The following examples are given to illustrate the invention, and are not intended to be limiting. Unless otherwise specified, the percentages given in the examples are by weight. The intrinsic viscosity of the polymers was measured in tetralin at 135° C.

EXAMPLE 1

0.5200 g of $Cl_3TiN(C_2H_5)_2$ and 14.1270 g of anhydrous $MgCL_2$ were ground under a nitrogen atmosphere at the temperature of 20° C. for 40 hours, in a glass mill (100 mm long, 50 mm. diameter) containing 550 g. of steel balls each having a diameter of 9.5 mm.

The ground active magnesium halide so obtained had a surface area of 30 m²/g.

0.0101 g. of the above-mentioned mixture and 1500 cc of n-heptane were introduced together with 2 cc of $Al(i-C_4H_9)_3$, under a nitrogen atmosphere, into a 3 liter stainless steel autoclave provided with a propeller stirrer and heated to 80° C.

Ethylene (10 atm) and hydrogen (5 atm) were added and the pressure (15 atm) was maintained constant throughout the run by continuously introducing ethylene.

After 8 hours, the polymerization was stopped, the polymerization product was filtered and the polymer obtained was dried.

There was obtained 496 g of polyethylene having a bulk density of 0.45 g/cc and an intrinsic viscosity, determined in tetralin at 135° C., of 1.85 dl/g.

The yield in polymer amounted to 6,530,000 g/g Ti.

EXAMPLE 2

1.1301 g of $Cl_2Ti[N(C_2H_5)_2]_2$ dissolved in 40 cc of anhydrous pentane, were added to a suspension containing 12.5180 g of $MgCl_2$ in 50 cc of anhydrous pentane.

The resulting suspension was kept under stirring for some minutes, after which the solvent was evaporated under a vacuum of 0.5 mm Hg.

The solid thus obtained was ground for 40 hours in the mill described in Example 1 at the temperature of 20° C. Using 0.0130 of this product and operating under the same polymerization conditions as those of Example 1, 15 g of polyethylene particles were obtained, showing a bulk density of 0.41 cc and an intrinsic viscosity determined in tetralin at 135° C. of 1.88 dl/d. The yield in polymer amounted to 812,000 g/g Ti.

EXAMPLE 3

In the mill described in Example 1, 0.9185 g of $Cl_3TiN(C_6H_5)_2$ and 14.9121 g of anhydrous $MgCl_2$ were ground for 40 hours at 20° C.

Using 0.0160 of this mixture and carrying out the polymerization of ethylene as in Example 1, there were obtained 615 g of polyethylene having a bulk density of 0.364 g/cc and an intrinsic viscosity, determined in tetralin at 135° C., of 2.0 dl/g. The yield in polymer amounted to 4,450,000 g/g Ti.

EXAMPLE 4

0.7190 g of $Ti[N(C_6H_5)_2]_4$ and 8.7380 g of anhydrous $MgCl_2$ were ground for 40 hours, at 20° C., in the mill described in Example 1.

Using 0.021 g of the mixture thus prepared and carrying out the polymerization of ethylene according to the procedure of Example 1, 70 g of polyethylene were obtained, having an intrinsic viscosity, determined in tetralin at 135° C., of 2.44 dl/g. The yield in polymer amounted to 660,000 g/g Ti.

EXAMPLE 5

0.8670 g of $(C_2H_5)_4NTiCl_4N(C_2H_5)_2$ prepared from $TiCl_3$ $N(C_2H_5)_2$ and $N(C_2H_5)_4Cl$ according to the method described by J. A. Creighton and J. H. S. Green in J. Chem. Soc. 808(1968)A. For compound $(C_2H_5)_4NTiCl_4N(C_2H_5)_2$, the analysis was: Cl found = 36.40% (calculated = 36–20%); Ti found = 12.07% (calculated = 12–23%). It was ground for 70 hours with 11.3100 g of anhydrous MgCl$_2$ under nitrogen atmosphere and at 20° C., in the mill described in Example 1.

Using 0.0200 of this mixture and operating according to Example 1, 358 g of polyethylene were obtained, having an intrinsic viscosity determined in tetralin at 135° C., of 2.0 dl/g. The yield in polymer amounted to 2,060,000 g/g Ti.

EXAMPLE 6

In the mill described in Example 1, there were ground for 72 hours, at 20° C., under nitrogen atmosphere, 1.4040 g of (C$_2$H$_5$)$_4$NTi$_2$Cl$_7$[N(C$_2$H$_5$)$_2$]$_2$, prepared according to the method of Example 5, from TiCl$_3$N(C$_2$H$_5$)$_2$ and N(C$_2$H$_5$)$_4$Cl in the molar ratio 2:1. For the compound (C$_2$H$_5$)$_4$NTi$_2$Cl$_7$[(N(C$_2$H$_5$)$_2$)], the analysis was: Cl found=39.60% (calculated=40.15%); Ti found=15-60% (calculated=15-50%); and 10.7970 g of anhydrous MgCl$_2$.

Using 0.0070 g of said mixture, and carrying out the polymerization of ethylene as in Example 1, there were obtained 235 g of polyethylene having an intrinsic viscosity, determined in tetralin at 135° C. of 1.8 dl/g. The yield in polymer amounted to 1,885,000 g/g Ti.

EXAMPLE 7

0.5890 g of Br$_3$TiN(C$_2$H$_5$)$_2$ and 8.0800 g of MgBr$_2$ were ground for 58 hours at 20° C., under a nitrogen atmosphere, in the mill described in Example 1.

Using 0.0126 g of the resulting mixture, and operating as described in Example 1, 495 g of polyethylene were obtained, having an intrinsic viscosity, determined in tetralin at 135° C., of 2.08 dl/g. The yield in polymer amounted to 4,850,000 g/g Ti.

EXAMPLE 8

In the mill described in Example 1, 0.9100 g of Br$_3$TiN(C$_2$H$_5$)$_2$ and 12.3550 g of MgCl$_2$ were ground for 48 hours, at 20° C., and under a nitrogen atmosphere.

Using 0.0132 g of the resulting mixture and carrying out the polymerization of ethylene according to Example 1, there were obtained 222 g of polyethylene, having an intrinsic viscosity, determined in tetralin at 135° C., of 1.68 dl/g. The yield in polymer amounted to 2,680,000 g/g Ti.

EXAMPLE 9

0.9360 g of LiTi(C$_{12}$H$_8$N)$_4$[N,N',N'',N'''] lithium titanium tetracarbazyl, prepared according to the method described by P. Longi and U. Nordio, Chimica e Industria 47, 593 (1965)] and 10.4880 g of anhydrous MgCl$_2$ were ground, under a nitrogen atmosphere, for 40 hours at 20° C., in the mill described in Example 1.

Using 0.0138 g of this mixture and carrying out the polymerization of ethylene as in Example 1, there were obtained 13.5 g of polyethylene, having an intrinsic viscosity, determined in tetralin at 135° C., of 2.4 dl/g. The yield in polymer amounted to 179,000 g/g Ti.

While Al triisobutyl was used as component (A) in preparing the catalysts used in the examples, equivalent results are obtained when other organometallic compounds (or hydrides) are used, such as those mentioned herein.

As will be apparent, various changes can be made in practicing the invention without departing from the spirit thereof. Therefore, we intend to include, in the appended claims, all such modifications as will be obvious to those skilled in the art from the description and working examples given herein.

What we claimed is:

1. A catalyst for polymerizing olefins and prepared by mixing
   (a) a catalyst-forming component which is a hydride or an organo-metallic compound of a metal belonging to Groups I to III inclusive of the Mendelyeev Periodic Table
with
   (b) a supported catalyst-forming component obtained by contacting a titanium compound having the general formula $$M_pTi_mX_{(n.m)+p}$$

in which n is the titanium valence, M is selected from the group consisting of alkaline metals, the ammonium radical and the ammonium radical substituted by hydrocarbon radicals, the $X_{(n.m)}$ substituents are NR$_2$ groups in which R is selected from the group consisting of hydrogen and hydrocarbon radicals and some of the Xs may represent halogen; p is a whole number from 0 to 3; and m is a whole number from 1 to 3; with a support comprising an active anhydrous magnesium dihalide characterized in that the X-rays powder spectrum thereof does not show the most intense diffraction lines as they appear in the X-rays powder spectrum of the normal, inert magnesium dihalide.

2. A catalyst according to claim 1, further characterized in that the magnesium halide is selected from the group consisting of MgCl$_2$ and MgBr$_2$.

3. A catalyst according to claim 1, characterized in that the Ti compound is contacted with an active anhydrous magnesium halide obtained by the disproportionation of a Grignard compound having the formula RMgX, in which R is a hydrocarbon radical, and X is halogen.

4. A catalyst according to claim 1, characterized in that the active anhydrous magnesium halide is obtained by treating a Grignard compound of the formula RMgX, in which R is a hydrocarbon radical and X is halogen, with a halogenated substance.

5. A catalyst according to claim 4, further characterized in that the halogenated substance is gaseous hydrochloric acid.

6. A catalyst according to claim 1, characterized in that component (a) is an aluminum alkyl compound.

7. A catalyst according to claim 6, further characterized in that component (a) is an aluminum trialkyl.

8. A catalyst according to claim 1, in which the amount of the Ti compound is from 0.01% to 30% by weight, based on the support weight.

9. A catalyst according to claim 1, in which the amount of the Ti compound is from 1% to 10% by weight, based on the the support weight.

10. A catalyst according to claim 1, catalyst-forming component (a) of which is a hydride of the metal belonging to Groups I to III.

11. A catalyst according to claim 1, catalyst-forming component (a) of which is aluminum triethyl.

12. A catalyst according to claim 1, catalyst-forming component (a) of which is aluminum tri-isobutyl.

13. A catalyst according to claim 1, in which the active magnesium dihalide is active MgCl$_2$.

14. A catalyst according to claim 1, in which the active magnesium dihalide is active MgBr$_2$.

15. The method of preparing the catalysts of claim 1, which comprises co-grinding the titanium compound with an initially inactive magnesium dihalide to activate said dihalide and obtain a catalyst-forming component (b), and mixing said component (b) with a catalyst-forming component (a).

16. The method according to claim 15, in which the co-grinding is carried out in the absence of inert liquid diluents.

17. The method of preparing the catalysts of claim 1, which comprises contacting the titanium compound with a magnesium dihalide in the active state at the time of the contacting to obtain a supported catalyst-forming component (b) and mixing said component (b) with a catalyst-forming component (a).

18. The method according to claim 17, in which the magnesium dihalide with which the titanium compound is contacted to obtain the supported catalyst-forming component (b) is in the active state as a result of pre-grinding thereof.

19. The method according to claim 17, in which the active magnesium dihalide is the disproportionation product of a Grignard compound having the formula RMgX, in which R is a hydrocarbon radical and X is halogen.

20. The method according to claim 17, in which the active magnesium dihalide is the product obtained by treating a Grignard compound of the formula RMgX, in which R is a hydrocarbon radical and X is halogen, with gaseous hydrochloric acid.

21. The process of polymerizing ethylene and mixtures thereof with at least one other olefin, which comprises effecting the polymerization in the presence of a catalyst according to claim 1.

22. The process according to claim 21, in which the polymerization is carried out at from $-80°$ C. to $200°$ C. in an inert liquid medium and in the presence of a regulator of the molecular weight of the polymer formed, the polymer thus obtained being directly useful without being subjected to purifying treatments for the removal of catalyst residues therefrom.

23. The process according to claim 21, further characterized in that the polymerization is carried out in the absence of an inert liquid medium.

* * * * *